United States Patent [19]

Charlanow

[11] Patent Number: 5,542,787
[45] Date of Patent: Aug. 6, 1996

[54] EXTRUDED LANDSCAPE TIMBER MODULES

[76] Inventor: Alexander Charlanow, 175 Davenport Rd., Big Flats, N.Y. 14814

[21] Appl. No.: 425,918

[22] Filed: Apr. 20, 1995

[51] Int. Cl.$^6$ ............................ E02D 29/00; E02D 5/00; E04G 7/00
[52] U.S. Cl. .................. 405/258; 405/262; 405/284; 403/231; 403/403; 52/71; 52/233
[58] Field of Search .................................. 405/284, 286, 405/258, 262; 52/71, 233; 403/401, 403, 231

[56] References Cited

U.S. PATENT DOCUMENTS

| | | | |
|---|---|---|---|
| 250,635 | 12/1881 | McLean | 405/284 |
| 3,355,204 | 11/1967 | Philpot | 403/231 X |
| 4,303,289 | 12/1981 | Hardy | 403/231 X |
| 4,517,780 | 5/1985 | Lacombe et al. | 52/233 |
| 4,787,185 | 11/1988 | Gascho | 405/284 |
| 4,903,447 | 2/1990 | McDade | 52/233 |
| 5,400,845 | 3/1995 | Choiniere et al. | 52/233 |
| 5,431,211 | 7/1995 | Guillemet | 403/403 X |
| 5,441,241 | 8/1995 | McKim | 403/403 X |

FOREIGN PATENT DOCUMENTS

| | | | |
|---|---|---|---|
| 2222220 | 2/1990 | United Kingdom | 403/401 |
| 2262790 | 6/1993 | United Kingdom | 403/401 |

Primary Examiner—Michael Powell Buiz
Assistant Examiner—Tara L. Mayo
Attorney, Agent, or Firm—George R. McGuire

[57] ABSTRACT

A landscaping system using a plurality of hollow, extruded, artificial timber modules for building a retaining wall is disclosed. The timber modules include top and bottom walls having ribs and channels extending longitudinally thereaolong, respectively. The ribs of one module snap-fit into the channels of another module to form a wall of vertically stacked modules. Each of the modules include a series of longitudinally spaced holes for receiving stakes therethrough to ensure the stacked modules do not slide with respect to one another. In addition, corner modules having first and second angularly disposed linear portions are adaptively formed to interconnect one set of vertically stacked timbers to another set of vertically stacked timbers. The first and second linear portions are formed to be cooperatively received within the first and second set of vertically stacked modules, respectively.

8 Claims, 5 Drawing Sheets

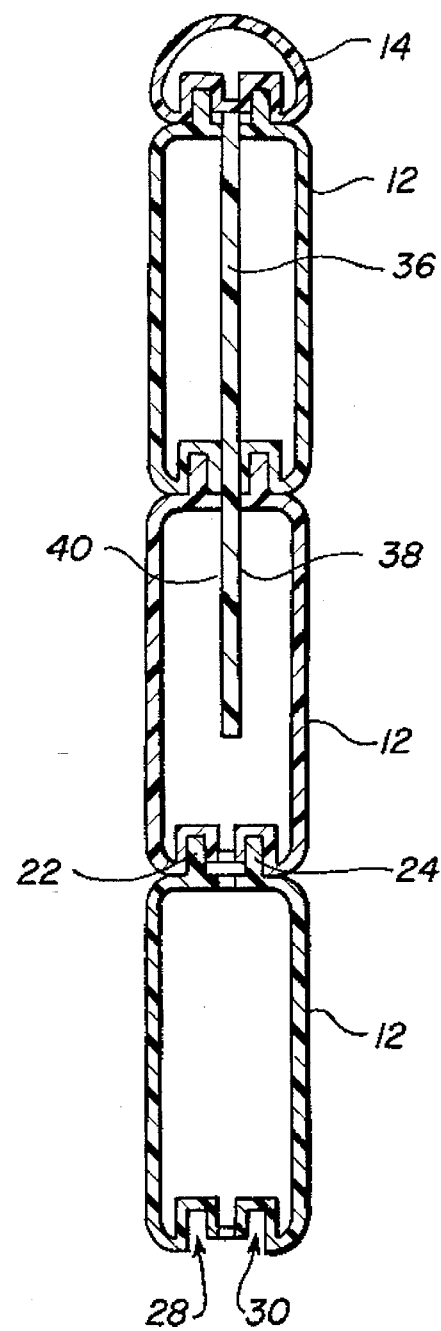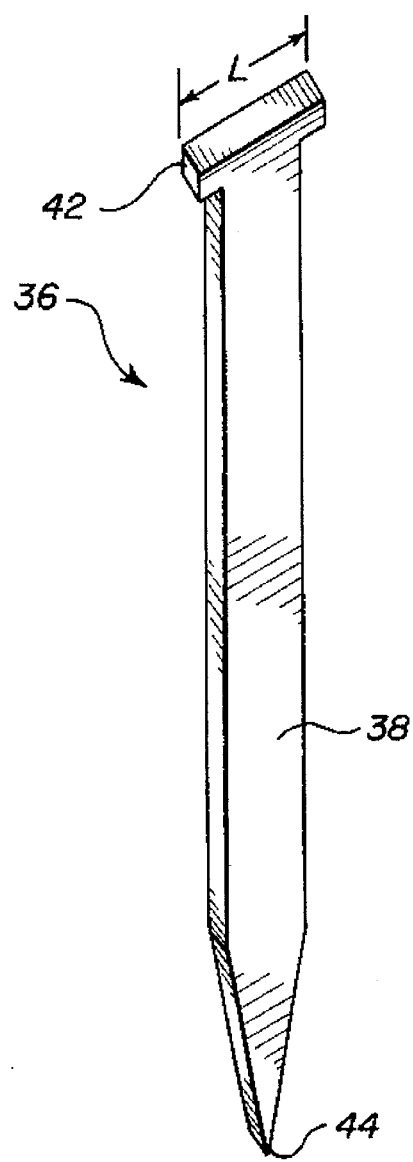

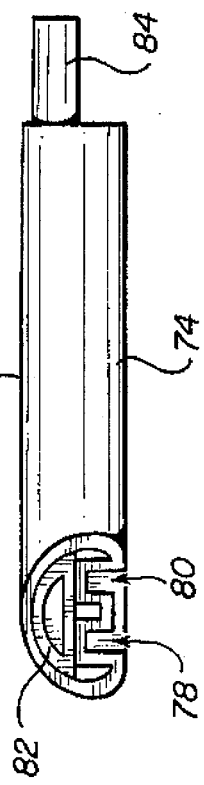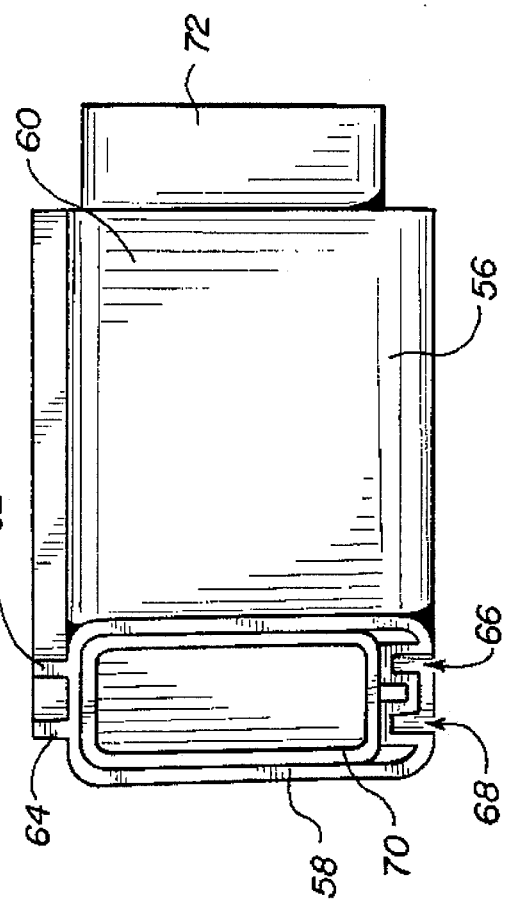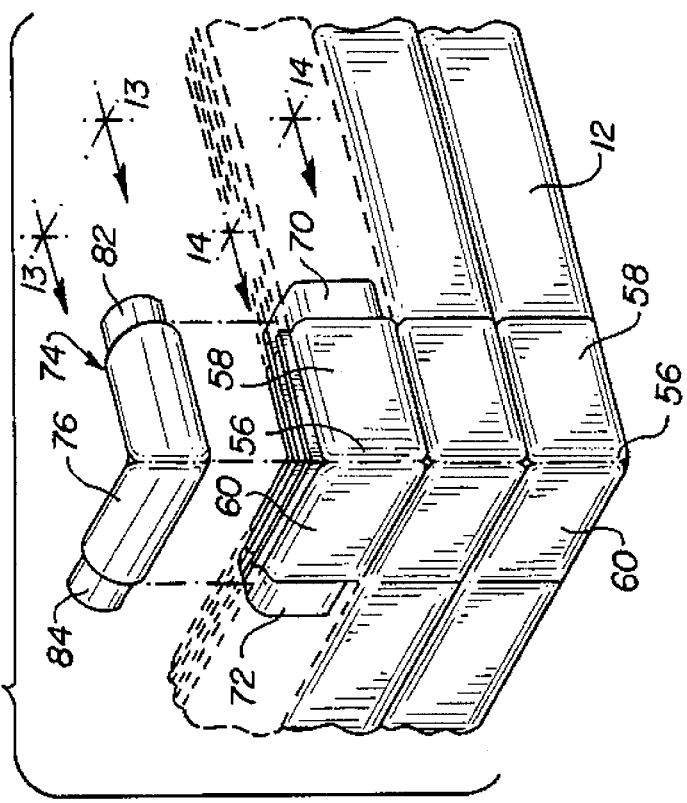

EXTRUDED LANDSCAPE TIMBER MODULES

BACKGROUND OF THE INVENTION

1. Field of Invention

The present invention generally relates to artificial timbers used for landscaping purposes. More particularly, the present invention relates to extruded, timber-like modules which are easily used by an individual to build landscaping walls or the like.

2. Description of Prior Art

Traditionally, pressure treated wood is the material of choice in building landscaping or retaining walls. The wood is cut into desired lengths of elongated beams and arranged in a desired manner (i.e., stacking, or lying side by side). The beams stacked upon one another may be joined together with stakes or long nails driven through one of the beams and partially through the other. While beams lying along side, or at angles to, one another would either be unconnected and permitted to settle naturally into the ground, or they may have some form of bracket joining them. In any event, using the wooden beams is heavy, difficult, time-consuming work.

Several systems have been developed to make building landscaping walls easier. Such systems are exemplified in U.S. Pat, Nos. 5,283,994 to Callison; and 4,834,585 to Hassenwinkle et al..

Both the '994 and '585 patents disclose systems using unique connection means to join the wooden timbers together, thereby facilitating quicker, easier assembly of landscaping walls. The '585 patent discusses drilling a plurality of holes at spaced intervals through each timber, along the central, longitudinal axis thereof. Stacked timbers can then be joined together by passing a dowel through aligned holes formed through the contacting timbers.

The '994 patent discloses forming a ball joint at one end of a length of timber and a socket joint at the opposite end. Adjacent timbers can then be joined at their respective ball and socket joints and reinforced with a connecting bracket spanning between the two timbers. Vertically stacked members are joined together by long spikes driven through vertically adjacent timbers.

3. Objects and Advantages

It is a principal object of the present invention to provide uniform, lightweight landscape timbers that are easily workable by an individual.

It is a further object of the present invention to provide landscape timbers that are easily and cheaply manufactured.

It is an additional object of the present invention to provide landscape timbers that are aesthetically pleasing.

Other objects and advantages of the present invention will in part be obvious and in part appear hereinafter.

SUMMARY OF THE INVENTION

In accordance with the foregoing objects and advantages, the present invention provides a landscape timber system generally comprised of a plurality of extruded, artificial timber modules. The extruded timbers can be arranged in a desired pattern on the ground and then vertically stacked upon one another, thereby forming a retaining wall. The timbers securely snap fit to one another and this connection is reinforced with elongated stakes which may pass through slots formed through the upper and lower walls of each timber.

The slots are formed at predetermined intervals along the central, longitudinal axis of both the upper and lower timber walls. The slots provide access for elongated stakes to pass through. The stakes passing through the ground contacting timbers extend far enough into the ground to secure these timbers in place. The stakes passing through the stacked timbers extend partially through the timber vertically adjacent below, thereby securely retaining the positioning between the two timbers.

Each timber includes two, elongated ribs extending longitudinally along each timber's respective upper wall. One rib is positioned on each side of the timber's central, longitudinal axis. Each timber also includes two elongated channels extending longitudinally along each timber's respective lower wall. The positioning of the channels and ribs correspond to one another so as to facilitate the snapping of the ribs of one timber into the channels of another. All channels and ribs are of substantially the same width so as to create a friction fit between the two when joined together.

BRIEF DESCRIPTION OF THE DRAWINGS

FIG. 10 is a cross sectional view taken along lines 10—10 of FIG. 1 the beam, cap and stake of the present invention;

FIG. 11 is a perspective view of a stake of the present invention;

FIG. 12 is a perspective view of the corner section of a wall partially exploded to show the components of a corner of the present invention;

FIG. 13 is an elevational view taken along lines 13—13 of FIG. 12 of a cap corner connector of the present invention;

FIG. 14 is an elevational view taken along lines 14—14 of FIG. 12 of a standard corner connector of the present invention.

DETAILED DESCRIPTION

Figure 1:
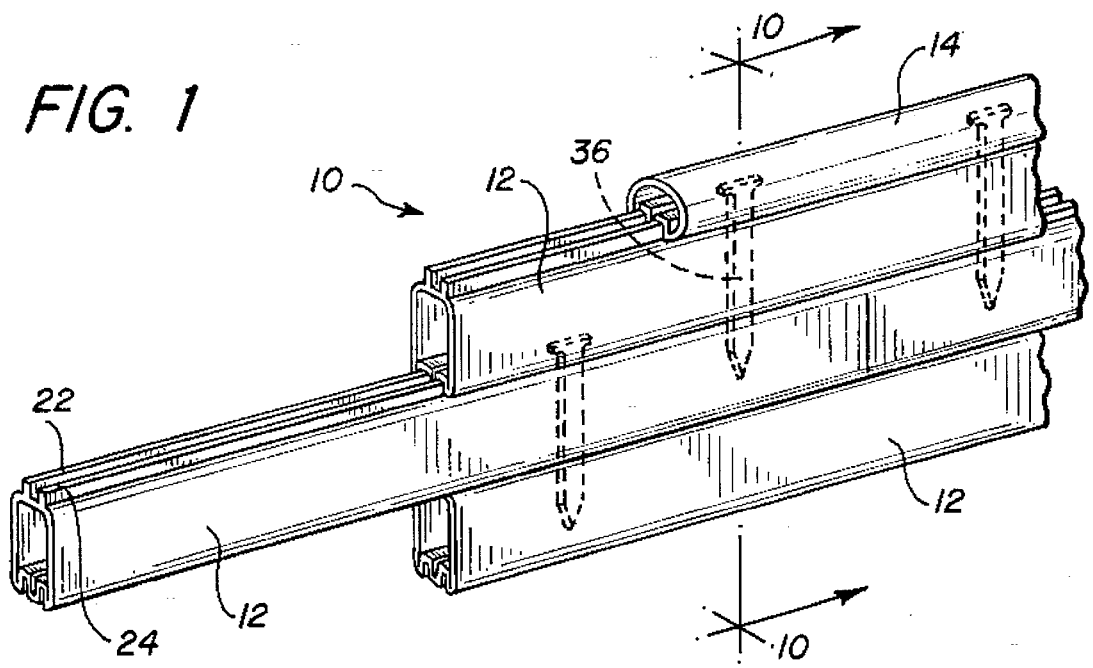
FIG. 1 is a perspective view of a partial wall created by the beams of the present invention.
Figure 2:
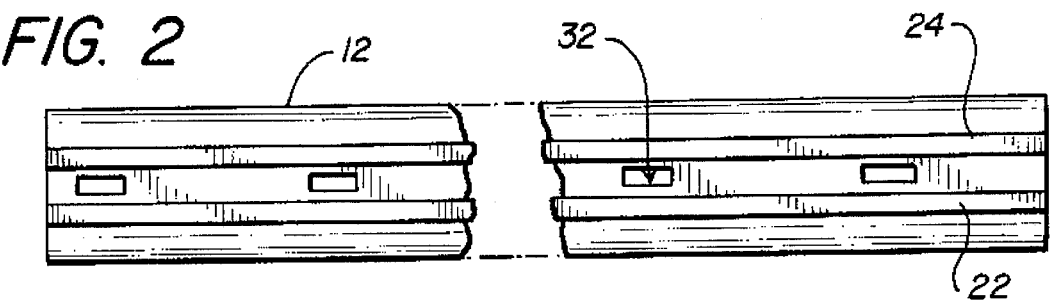
FIG. 2 is a top plan view of a beam of the present invention.
Figure 3:
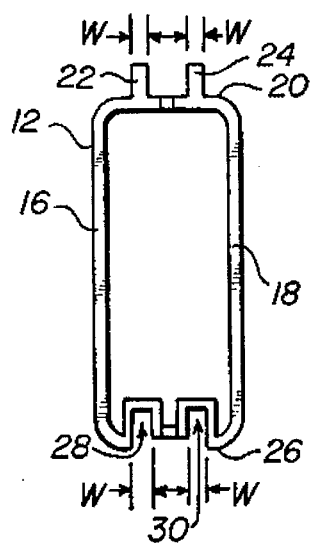
FIG. 3 is an end view of a beam of the present invention.
Figure 4:
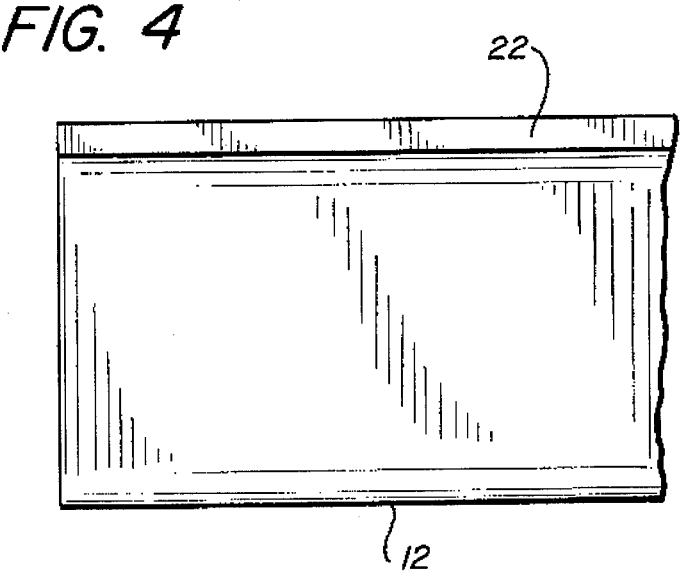
FIG. 4 is a side elevational view of a beam of the present invention.
Figure 5:
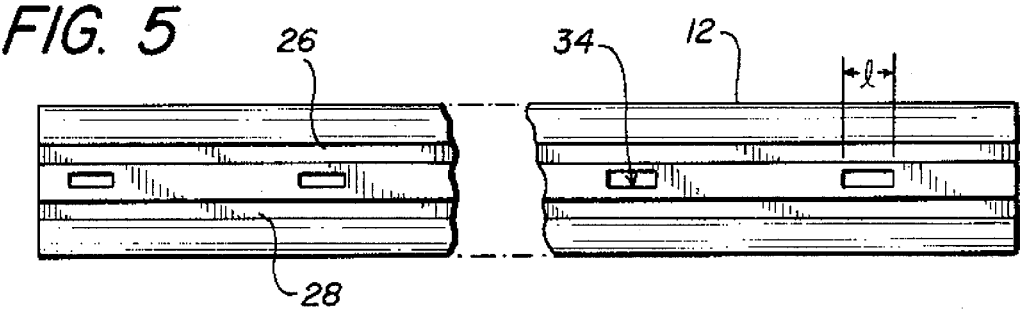
FIG. 5 is a bottom plan view of a beam of the present invention.
Figure 6:
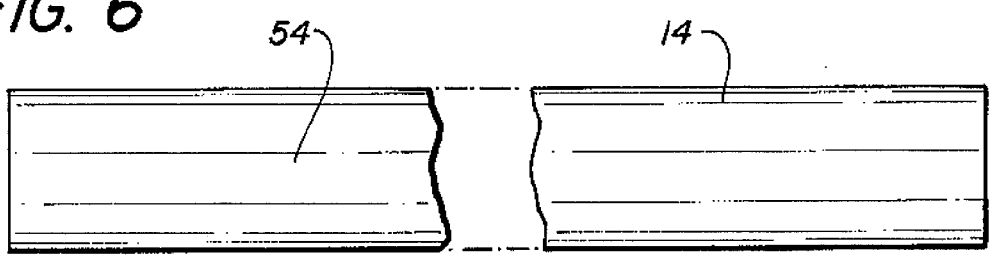
FIG. 6 is a top plan view of a top, cap beam of the present invention.
Figure 7:
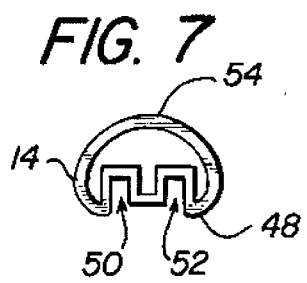
FIG. 7 is an end view of a top, cap beam of the present invention.
Figure 8:
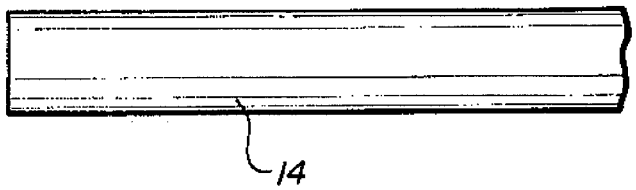
FIG. 8 is a side elevational view of a top, cap beam of the present invention.
Figure 9:
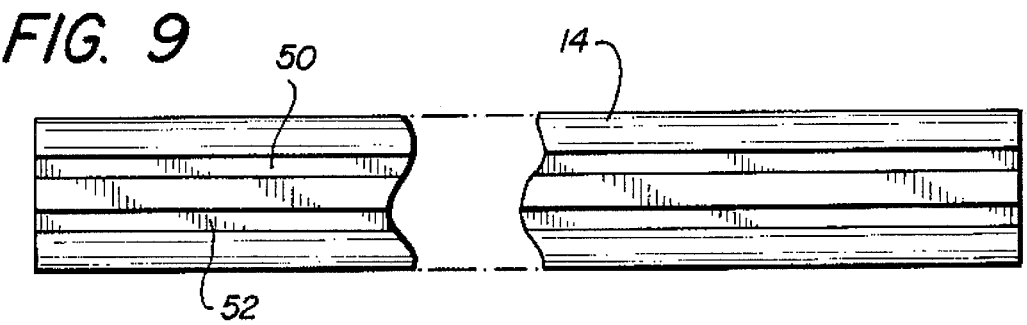
FIG. 9 is a bottom plan view of a top, cap beam of the present invention.

Referring now to the drawings, wherein like reference numerals refer to like parts throughout, there is seen in FIG. 1 a portion of a retaining wall denoted generally by reference numerals 10. Wall 10 is generally constructed of a plurality of elongated, beam-like timber modules 12 interconnected to one another through a series of snap-fit channels and ribs, and stakes, as will be explained in greater detail hereinafter. To complete construction of wall 10, an elongated top, cap beam 14 may be placed in attached, covering relation to the timber module 12 in the wall.

As seen in FIGS. 2–5, modules 12 are of generally hollow, recti-linear configuration and include planar side walls 16 and 18, a top wall 20 having two, laterally spaced ribs 22 and 24 extending longitudinally therealong, and a bottom wall 26 having two, laterally spaced channels 28 and 30 extending longitudinally therealong. Ribs 22, 24 and channels 28, 30 are vertically aligned with one another, respectively, and are of substantially identical widths W. The position and size of ribs 22, 24 and channels 28, 30 permit two of modules 12 to be attached, one on top of the other, by force fitting the channels 28, 30 of one onto the ribs 22, 24 of the other.

Figure 15:
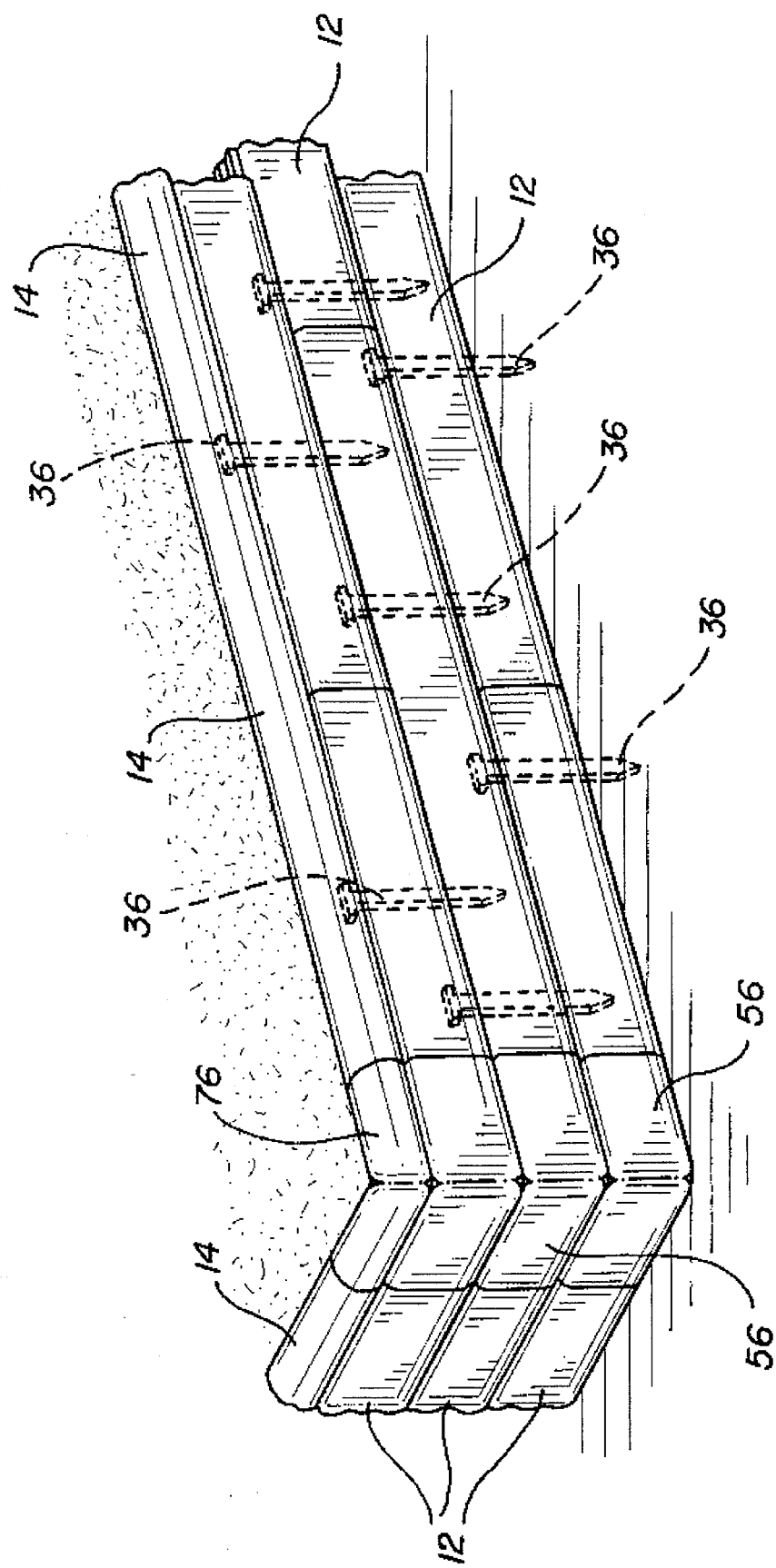
FIG. 15 is a partial perspective view showing all the components of the present invention.

Modules 12 further include a plurality of longitudinally spaced slots 32 and 34 formed through top and bottom walls 20, 26, respectively, and positioned between ribs 22, 24 and channels 28, 30, respectively. Slots 32 and 34 are correspondingly, axially aligned with one another to permit the passage of an elongated stake 36 therethrough, as illustrated in FIGS. 10 and 15. Stakes 36 prevent lateral displacement of the stacked modules 12, and the stakes 36 passing through the ground contacting module 12 maintain retaining wall 10 in fixed position on the ground.

As seen most clearly in FIG. 11, stakes 36 are of the blade type. Stakes 36 include first and second planar surfaces 38, 40, respectively, extending between an elongated top end 42 and a point 44. Top end 42 extends transverse to the longitudinal axis of stake 36 and is of a length L slightly longer than the length 1 of the slots 32, 34, thereby ensuring that stakes 36 don't fall through modules 12. In addition, the width and thickness of first and second surfaces 38, 40 are substantially equal to the length and width of slots 32, 34, respectively, thereby requiring stakes 36 to be force fit through slots 32, 34 and ensuring that stakes 36 will maintain the connection between two modules 12.

As was previously explained, modules 12 may be stacked upon one another and snap fit together via the interlocking ribs 24, 22 and channels 30, 28. Once the wall 10 has been constructed to its desired dimensions, an elongated, top module 14 may be attached in covering relation to top surface 20 of the uppermost module 12. Top modules 14 includes a bottom surface 48 having two channels 50, 52 extending across its entire length, parallel to the module's longitudinal axis. Channels 50, 52 are substantially identical to channels 28, 30 formed in the bottom surfaces 26 of modules 12. Thus, channels 50, 52 snap fit onto the ribs 22, 24 extending along top surface 20 of uppermost module 12, thereby attaching top module 14 atop the retaining wall 10. Top module 14 further includes a rounded, top surface 54 which serves to give top module 14, and therefore retaining wall 10, a cosmetically finished looked. Of course, top surface 54 may be of any geometry, not necessarily round.

If it is desired to build a retaining wall in a shape other than linear, it will be necessary to join various linear segments of wall together. To accomplish this, a corner module 56 may be used to construct an angular joining together of two linear modules 12, as is illustrated in FIG. 12. Thus, a non-linear retaining wall, as illustrated in FIG. 15, may be constructed through use of modules 12 and corner modules 56.

Referring now to FIG. 14, the structure of corner modules 56 are similar to modules 12. Corner modules 56 include first and second, linear sections 58 and 60 which diverge from one another at a 90 degree angle. The top of corner module 56 includes first and second ribs 62 and 64 extending parallel to the linear axes of respective first and second linear sections 58 and 60. The bottom surface of corner module 56 includes first and second channels 66 and 68 which extend parallel to the respective linear axis of linear sections 58 and 60. Ribs 62, 64 and channels 66, 68 serve the same function as do ribs 22, 24 and channels 28, 30 of modules 12 (i.e., to permit one module to be snap fit atop another module).

Corner modules 56 also include structural means for permitting corner modules 56 to be securely attached to modules 12. Each corner module 56 includes first and second flanges 70, 72 extending outwardly from the ends of first and second linear sections 58, 60, respectively. Flanges 70, 72 are cooperatively formed to be securely received within a linear module 12 positioned adjacent thereto, as is illustrated in FIG. 12. Flanges 70, 72 are rectangularly shaped and are sized to contact the interior surfaces of the upper and side walls, and the upper, interior surface of channels 30, 28 of modules 12. Modules 12 are intended to be forcibly slid over a flange 70, 72 to ensure a secure connection between corner modules 56 and modules 12.

As illustrated in FIG. 13, a top, corner module 74 is used to angularly join top, linear modules 14 together. Top, corner module 74 includes a rounded top portion 76 which corresponds to the shape of top surface 54, and includes first and second channels 78, 80 which snap fit onto first and second ribs 62, 64, respectively, of the uppermost corner module 56. Top corner module 74 further includes first and second flanges 82, 84 extending outwardly from the ends of the modules' linear portions. Flanges 82, 84 provide the interconnection between two, linear, top modules 14 in the same manner as flanges 70, 72 do in corner modules 56.

The shapes of modules 12, 14, 56 and 74 are for illustrative purposes only. Other shapes could be implemented without departing from the scope of the present invention. In addition, corner modules 56, 74 could be formed at any desired angle, 90 degrees was chosen for illustrative purposes only.

What is claimed is:

1. A system for constructing a landscaping structure comprising:

a) a first set of at least two elongated timber modules each having first and second opposing surfaces which lie in first and second substantially parallel planes, respectively, and a first and second longitudinal axis extending centrally along said first and second surfaces, respectively;

b) a second set of at least two elongated timber modules each having first and second opposing surfaces which lie in first and second substantially parallel planes, respectively, and a first and second longitudinal axis extending centrally along said first and second surfaces, respectively, said first and second longitudinal axes of said first set of at least two elongated timber modules extending in intersecting relation to said first and second longitudinal axes of said second set of at least two elongated timber modules;

c) means for snap-fitting said first surface of one of said first and second sets of at least two timber modules to said second surface of another of said first and second sets of at least two timber modules, respectively, whereby said at least two timber modules of each of said first and second sets are vertically stacked upon one another, respectively;

d) at least first and second corner modules adaptively formed to interconnect said first and second sets of at least two elongated timber modules, said first and second corner modules each having first and second linear portions angularly disposed to one another, said first and second linear portions each including a longitudinal axis extending therealong, whereby when said first and second corner modules are connected between said first and second sets of at least two timber modules, said longitudinal axis of said first linear portion is parallel to said first and second longitudinal axes of said first set of at least two elongated timber modules, and said longitudinal axis of said second linear portion is parallel to said first and second longitudinal axes of said second set of at least two elongated timber modules; and e) means for connecting said first linear portions of said at least two corner modules to said first set of said at least two elongated timber modules, respectively, and for connecting said second linear portions of said at least two corner modules to said second set of said at least two elongated timber modules, respectively.

2. The invention according to claim 1 wherein said snap-fitting means includes:

a) said first surface of said one of said first and second sets of at least two timber modules includes at least one rib of predetermined shape protruding outwardly therefrom and longitudinally therealong;

b) said second surface of said another of first and second sets of said at least two timber modules includes at least one channel corresponding substantially identically in shape, number and position as said at least one rib, whereby upon placing said first surface of one of said first and second sets of at least two modules in contacting relation to said second surface of said another of said first and second sets of at least two modules, respectively, said channel and rib matingly engage one another.

3. The invention according to claim 2 wherein said first surfaces of said first and second sets of at least two timber modules include first and second spaced ribs extending longitudinally therealong in parallel relation to one another, and said second surfaces of said first and second sets of at least two timber modules include first and second spaced channels extending longitudinally therealong in corresponding relation to said first and second ribs and in parallel relation to one another, respectively.

4. The invention according to claim 1 wherein said first and second surfaces of said first and second sets of at least two timber modules include a first and second plurality of longitudinal openings formed therethrough, respectively, each of said first plurality of openings being axially aligned with a corresponding one of said second plurality of openings, respectively.

5. The invention according to claim 4 wherein said landscaping system includes at least two longitudinal stakes, one of said at least two stakes to be used on said first set of at least two elongated timber modules, and another of said at least two stakes to be used on said second set of at least two elongated timber modules, whereby said stake may be passed through one of each of said corresponding first and second openings.

6. The invention according to claim 1 wherein said means for connecting said at least two corner modules between said first and second sets of at least two timber modules comprises:

a) each module of said first and second sets of said at least two elongated timber modules being tubular and having hollow interior cavities of predetermined contour;

b) said first and second linear portions of said at least two corner modules include first and second flange portions, respectively, extending outwardly therefrom along common of said first and second longitudinal axis, respectively; and c) said first and second linear portions being adaptively shaped to be cooperatively and securely received within said hollow interior cavities of said first and second sets of at least two elongated timber modules, respectively.

7. The invention according to claim 6 wherein said predetermined contour of said cavities and said shape of said first and second flange portions are essentially rectangular.

8. The invention according to claim 1 wherein said first and second linear portions are perpendicular to one another.

* * * * *